US012296602B2

(12) United States Patent
Choi

(10) Patent No.: US 12,296,602 B2
(45) Date of Patent: May 13, 2025

(54) INK SUPPLY SYSTEM OF INK-JET HEAD PROVIDED WITH EMERGENCY DRAIN FUNCTION AND INK-JET PRINTER HAVING SAME

(71) Applicant: GOSANTECH CO., LTD., Cheonan-si (KR)

(72) Inventor: Yunseok Choi, Cheonan-si (KR)

(73) Assignee: GOSANTECH CO., LTD., Cheonan-si (KR)

(*) Notice: Subject to any disclaimer, the term of this patent is extended or adjusted under 35 U.S.C. 154(b) by 131 days.

(21) Appl. No.: 18/351,567

(22) Filed: Jul. 13, 2023

(65) Prior Publication Data

US 2024/0075748 A1 Mar. 7, 2024

(30) Foreign Application Priority Data

Sep. 6, 2022 (KR) ........................ 10-2022-0112673

(51) Int. Cl.
*B41J 2/18* (2006.01)
*B41J 2/175* (2006.01)

(52) U.S. Cl.
CPC ............. *B41J 2/18* (2013.01); *B41J 2/17596* (2013.01)

(58) Field of Classification Search
CPC . B41J 2/18; B41J 2/17596; B41J 2/175; B41J 2/04563; B41J 2/14153; B41J 29/02; B41J 2/16508; B41J 2/14129; B41J 2/14072; B41J 2/0451; B41J 29/38; B41J 2/16526; B41J 2/0458; B41J 2/16579; B41J 2202/18; B41J 2202/12; B41J 2002/14387
See application file for complete search history.

(56) References Cited

U.S. PATENT DOCUMENTS

| | | | | |
|---|---|---|---|---|
| 9,272,523 | B2 * | 3/2016 | Sanaei | B41J 2/17596 |
| 11,014,354 | B2 * | 5/2021 | Kinoshita | B41J 2/18 |
| 11,919,318 | B2 * | 3/2024 | Fukasawa | B41J 2/04563 |
| 2014/0118448 | A1 * | 5/2014 | Domae | B41J 2/18 347/89 |

FOREIGN PATENT DOCUMENTS

| | | | |
|---|---|---|---|
| JP | 4382013 | B2 | 12/2009 |
| JP | 2019-171754 | A | 10/2019 |
| JP | 2020-163839 | A | 10/2020 |
| KR | 10-2021-0122080 | A | 10/2021 |

OTHER PUBLICATIONS

Korean Office Action dated May 20, 2024 in Application No. 10-2022-0112673.

* cited by examiner

*Primary Examiner* — An H Do
(74) *Attorney, Agent, or Firm* — Sughrue Mion, PLLC

(57) ABSTRACT

Proposed are an ink supply system of an ink-jet head provided with an emergency drain function and an ink-jet printer having the ink supply system. The ink supply system includes an ink-jet head, an ink storage apparatus, a supply flow path configured to supply ink to the ink-jet head, a recovery flow path configured to return at least some of ink to the ink storage apparatus, a flow path blocker configured to block an ink flow in an emergency situation, a flow path changer configured to block an ink flow and to connect a drain pipe with the ink-jet head in the emergency situation, the drain pipe connected to the flow path changer and connected to the ink-jet head in the emergency situation, a drain ink storage portion configured to drain and store ink in the emergency situation, and a drain portion configured to drain ink in the emergency situation.

12 Claims, 8 Drawing Sheets

INK SUPPLY SYSTEM OF INK-JET HEAD PROVIDED WITH EMERGENCY DRAIN FUNCTION AND INK-JET PRINTER HAVING SAME

CROSS REFERENCE TO RELATED APPLICATION

The present application claims priority to Korean Patent Application No. 10-2022-0112673, filed Sep. 6, 2022, the entire contents of which are incorporated herein for all purposes by this reference.

BACKGROUND OF THE INVENTION

Field of the Invention

The present disclosure relates to a system of supplying ink to an ink-jet head in an ink-jet printer. More particularly, the present disclosure relates to an ink supply system of an ink-jet head capable of performing emergency drain of ink in the ink-jet head when an ink-jet printer is stopped, and relates to the ink-jet printer including the ink supply system.

Description of the Related Art

Currently, in various industrial fields, a device that discharges liquid is used for various purposes. For example, liquid is discharged on the desired position to form a pattern for a purpose of drawing a specific shape such as an electric circuit and so on. Furthermore, liquid is thinly discharged in order to manufacture a thin fiber, or liquid is discharged on a surface of a target object of coating in order to coat the surface thereof.

An ink-jet printing method of ejecting liquid ink on a surface of a medium in the form of droplets according to a shape signal is used not only for printing of documents and leaflets but also for solution processing in industrial fields of semiconductors and displays.

An application range of ink-jet printing which can form a complicated pattern on a substrate or accurately discharge ink on a specific position has been expanding. A small ink-jet printer for document writing has the form in which ink is stored in an ink-jet head that discharges ink droplets. However, a large document printer or an industrial-use ink-jet printer uses a large amount of ink, and a structure in which an ink storage portion and an ink-jet head are separated from each other is used.

In order to discharge an exact amount of ink in the ink-jet printing process, it is necessary to maintain the ink in a meniscus state in which the surface of the ink ready for ejection from the ink-jet head has a concave shape due to a capillary phenomenon with respect to a nozzle inlet. To this end, it is common that a position of a head supply reservoir is positioned at a position higher than a position of an ink-jet head, and the inside of the head supply reservoir is maintained in a vacuum to generate a negative pressure in the head supply reservoir, thereby maintaining the meniscus state by preventing ink from flowing out of the ink-jet head.

As such, in a state in which ink is continuously supplied to the ink-jet head, an industrial ink-jet printer is configured to perform printing by discharging the required amount of ink to an accurate position through a discharging operation of a nozzle and a gas pressure control apparatus. However, when an emergency situation such as a power outage occurs and a control of a nozzle or a gas pressure control apparatus of an ink-jet head included in an ink-jet printing apparatus is released, there is a problem that ink is leaked through the ink-jet head. As such, in order to prevent ink from leaking through the ink-jet head, a technology of blocking ink supplied to the ink-jet head in an emergency situation is applied, but ink already supplied to the ink-jet head is all leaked. As such, when ink supplied to the ink-jet head is leaked, a printing target object positioned below the ink-jet head cannot be used, and also an operation may be started again only after contamination of the surrounding area is resolved, so that there is a problem that productivity is significantly reduced.

Document of Related Art (Patent Document 1) Japanese Patent No. 4382013

SUMMARY OF THE INVENTION

Accordingly, the present disclosure has been made keeping in mind the above problems occurring in the related art, and an objective of the present disclosure is to provide an ink supply system of an ink-jet head capable of preventing leakage of ink by draining all ink supplied to the ink-jet head, and to provide an ink-jet printer having the ink supply system.

In order to achieve the above objective, there is provided an ink supply system of an ink-jet head provided with an emergency drain function, the ink supply system including: an ink-jet head having a nozzle configured to discharge ink; an ink storage apparatus in which ink supplied to the ink-jet head is stored; a supply flow path configured to supply ink stored in the ink storage apparatus to the ink-jet head; a recovery flow path configured to return at least some of ink supplied to the ink-jet head to the ink storage apparatus; a flow path blocker mounted at any one of the supply flow path and the recovery flow path, the flow path blocker being configured to block an ink flow between the ink-jet head and the ink storage apparatus in an emergency situation; a flow path changer mounted at the other one of the supply flow path and the recovery flow path, the flow path changer being configured to block an ink flow between the ink-jet head and the ink storage apparatus and to connect a drain pipe with the ink-jet head in the emergency situation; the drain pipe connected to the flow path changer, thereby being connected to the ink-jet head in the emergency situation; a drain ink storage portion connected to the drain pipe, the drain ink storage portion being configured to drain and store ink already supplied in the ink-jet head in the emergency situation; and a drain portion configured to drain ink already supplied in the ink-jet head in the emergency situation.

The ink supply system may further include a return flow path connecting the drain ink storage portion and the ink storage apparatus to each other so that ink stored in the drain ink storage portion is capable of being returned to the ink storage apparatus.

The ink supply system may further include a return valve, the return valve being mounted at the return flow path and being configured to control a connection between the drain ink storage portion and the ink storage apparatus.

The drain portion may be a gas pressure control apparatus capable of applying a negative pressure and a positive pressure to the drain ink storage portion, may be configured to apply the negative pressure to the drain ink storage portion when ink already supplied to the ink-jet head is drained through the drain pipe, and may be configured to apply the positive pressure to the drain ink storage portion when ink stored in the drain ink storage portion is returned to the ink storage apparatus.

The flow path blocker may be a normally closed valve.

In the flow path changer, a normally open valve may be mounted between the ink-jet head and the drain pipe, and a normally closed valve may be mounted between the ink-jet head and the ink storage apparatus.

According to another aspect of the present disclosure, there is provided an ink-jet printer having an ink supply system of an ink-jet head provided with an emergency drain function, the ink supply system including: an ink-jet head having a nozzle configured to discharge ink; an ink storage apparatus in which ink supplied to the ink-jet head is stored; a supply flow path configured to supply ink stored in the ink storage apparatus to the ink-jet head; a recovery flow path configured to return at least some of ink supplied to the ink-jet head to the ink storage apparatus; a flow path blocker mounted at any one of the supply flow path and the recovery flow path, the flow path blocker being configured to block an ink flow between the ink-jet head and the ink storage apparatus in an emergency situation; a flow path changer mounted at the other one of the supply flow path and the recovery flow path, the flow path changer being configured to block an ink flow between the ink-jet head and the ink storage apparatus and to connect a drain pipe with the ink-jet head in the emergency situation; the drain pipe connected to the flow path changer, thereby being connected to the ink-jet head in the emergency situation; a drain ink storage portion connected to the drain pipe, the drain ink storage portion being configured to drain and store ink already supplied in the ink-jet head in the emergency situation; and a drain portion configured to drain ink already supplied in the ink-jet head in the emergency situation.

The ink-jet printer may further include a return flow path connecting the drain ink storage portion and the ink storage apparatus to each other so that ink stored in the drain ink storage portion is capable of being returned to the ink storage apparatus.

The ink-jet printer may further include a return valve, the return valve being mounted at the return flow path and being configured to control a connection between the drain ink storage portion and the ink storage apparatus.

The drain portion may be a gas pressure control apparatus capable of applying a negative pressure and a positive pressure to the drain ink storage portion, may be configured to apply the negative pressure to the drain ink storage portion when ink already supplied to the ink-jet head is drained through the drain pipe, and may be configured to apply the positive pressure to the drain ink storage portion when ink stored in the drain ink storage portion is returned to the ink storage apparatus.

The flow path blocker may be a normally closed valve.

In the flow path changer, a normally open valve may be mounted between the ink-jet head and the drain pipe, and a normally closed valve may be mounted between the ink-jet head and the ink storage apparatus.

In the present disclosure as described above, in an emergency situation such as a power outage, since not only a space between the ink-jet head and the ink storage apparatus is blocked but also ink already supplied to the ink-jet head is drained, there are effects that ink pushed during a process of closing a diaphragm valve is prevented from leaking and ink already supplied to the ink-jet head is prevented from leaking.

In addition, since leakage of ink is prevented through the emergency drain function, there is an effect that a problem in which a printing target object or the ink-jet printer is contaminated due to leakage of ink does not occur.

Furthermore, after an emergency situation is resolved, since a time required for cleaning and maintenance of the ink-jet printer contaminated with leaked ink so that a process is capable of being resumed may be reduced, efficiency of a process using the ink-jet printer may be increased.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
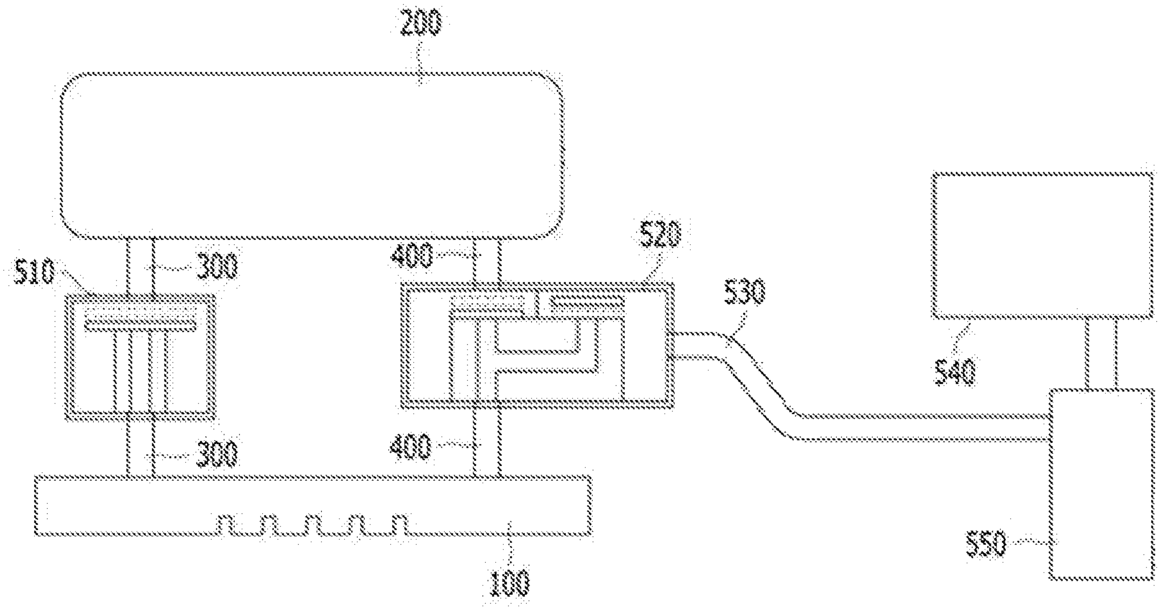
FIG. 1 is a view illustrating a main configuration of an ink supply system of an ink-jet head provided with an emergency drain function according to a first embodiment of the present disclosure.

Hereinafter, an embodiment of the present disclosure will be described in detail with reference to the accompanying drawings.

However, embodiments of the present disclosure may be modified in a variety of different forms, and the scope of the present disclosure is not limited to the embodiments described below. The shapes and sizes of the elements in the drawings may be exaggerated for clarity, and elements denoted by the same reference numerals in the drawings are the same elements.

Throughout the specification, it will be understood that when an element is referred to as being “connected” to another element, it can be directly connected to the other element or it can be electrically connected with the other element and intervening elements may be present therebetween. In addition, it will be further understood that when a part “comprises”, “includes”, or “has” an element, this means that other elements are not excluded but may be further included, unless otherwise stated.

Also, the teams such as “first”, “second”, etc. may be used to distinguish one element from another element, and the scope of the present disclosure must not be limited by these terms. For example, a first constitutive element may be referred as a second constitutive element, and the second constitutive element may be also referred to as the first constitutive element.

Figure 2:
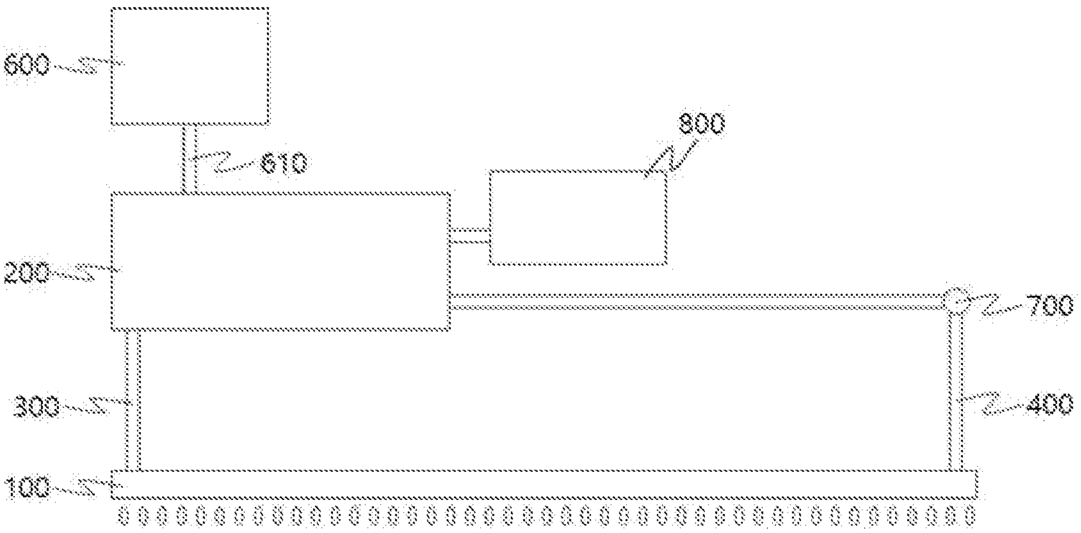
FIG. 2 is a view illustrating an ink supply structure in which the ink supply system of the ink-jet head provided with the emergency drain function of the present disclosure is capable of being applied.

FIG. 1 is a view illustrating a main configuration of an ink supply system of an ink-jet head provided with an emergency drain function according to a first embodiment of the present disclosure, and FIG. 2 is a view illustrating an ink supply structure in which the ink supply system of the ink-jet head provided with the emergency drain function of the present disclosure is capable of being applied.

The ink supply system of the ink-jet head provided with the emergency drain function according to the first embodiment of the present disclosure may be applied to an ink-jet printer having the ink supply system illustrated in FIG. 2 in which the ink supply structure is a circulation type, and the circulation type ink supply structure will be described first.

An ink-jet head 100 is a portion provided with a nozzle that is configured to discharge ink, an ink-jet printer illustrated is configured for the purpose of being used for industrial use, and the ink-jet printer is configured such that the ink-jet head 100 and an ink storage apparatus 200 are separated from each other. In a specific configuration of the ink-jet head 100, all technical configurations of a conventionally used ink-jet head may be applied within a range that does not impair characteristics of the present disclosure. Specifically, the specific configuration of the ink-jet head 100 may include a configuration for discharging bubbles to the outside of the ink-jet head 100 so that the nozzle of the ink-jet head 100 is not blocked by fine bubbles.

The ink storage apparatus 200 is a portion in which ink is stored so as to provide the ink to the ink-jet head 100. Furthermore, a first end of a supply flow path 300 for supplying ink to the ink-jet head 100 and a first end of a recovery flow path 400 in which ink remaining in the ink-jet head 100 is circulated and returned are connected to the ink storage apparatus 200, and a first end of a pressure control pipe 610 for maintaining a meniscus state is connected to the ink storage apparatus 200.

A second end of the supply flow path 300 and a second end of the recovery flow path 400 that respectively have the first ends connected to the ink storage apparatus 200 are connected to the ink-jet head 100. Furthermore, the ink-jet head 100 is supplied with ink through the supply flow path 300 and is configured to perform an ink-jet printing through the nozzle, and at least some of the supplied ink is recovered to the ink storage apparatus 200 through the recovery flow path 400 and is circulated.

A second end of the pressure control pipe 610 is connected to a gas pressure control apparatus 600, and the gas pressure control apparatus 600 is configured to control a pressure of the ink storage apparatus 200, thereby applying a negative pressure to the inside of the ink storage apparatus 200 so that ink inside the ink-jet head 100 maintains the meniscus state. After all, except for a special case, since a configuration in which air is continuously suctioned through the pressure control pipe 610 is provided, droplets of ink spread upward are capable of being moved through the pressure control pipe 610 while bubbles formed in the ink storage apparatus 200 burst. Droplets of ink introduced into the pressure control pipe 610 cause a failure of the gas pressure control apparatus 600.

A circulation pump 700 is mounted at the recovery flow path 400 through which at least some of ink supplied to the ink-jet head 100 is returned to the ink storage apparatus 200, and is configured to circulate ink. In an embodiment in FIG. 2, a case in which the circulation pump 700 is mounted at the recovery flow path 400 is illustrated, but there is no limitation, and the circulation pump 700 may be mounted at the supply flow path 300. As illustrated in the drawings, the circulation pump 700 is capable of maintaining dispersibility of ink by continuously circulating the ink between the ink storage apparatus 200 and the ink-jet head 100. At this time, it is preferable that an operation of the circulation pump 700 does not affect the meniscus state.

A buffer storage portion 800 may be applied so as to inject ink into the ink storage apparatus 200 without damaging the meniscus state. Furthermore, when ink is added to the buffer storage portion 800, additional ink is capable of being injected without considering the meniscus state. A loss occurs when printing is stopped during a process of replenishing ink consumed by performing the printing. However, when ink is replenished through the buffer storage portion 800, ink is capable of being continuously replenished without stopping the printing process.

As illustrated in FIG. 1, the ink supply system of the ink-jet head provided with the emergency drain function according to the first embodiment of the present disclosure is the same as a general circulation type ink supply system in that the ink supply system of the present disclosure includes the ink-jet head 100, the ink storage apparatus 200, the supply flow path 300, and the recovery flow path 400 that are as main components. In addition, the ink supply system of the present disclosure further includes a flow path blocker 510, a flow path changer 520, a drain pipe 530, a drain ink storage portion 550, and a drain portion 540 that are as an emergency drain portion.

The ink-jet head 100 is provided with the nozzle that is configured to discharge ink, and a configuration used for a head of an ink-jet printer that is commonly used for industrial use may be applied without limitation.

The ink storage apparatus 200 is a portion which is separated from the ink-jet head 100 and in which ink supplied to the ink-jet head 100 is stored. Although not illustrated, a gas pressure control apparatus configured to maintain the meniscus state in the ink-jet head 100 may be connected to the ink storage apparatus 200, and a buffer storage apparatus for injecting additional ink while the meniscus state is maintained may be connected to the ink storage apparatus 200. An ink storage apparatus configuration of a general ink-jet printer may be applied to such an ink storage apparatus 200 without limitation within a range that does not impair characteristics of the present disclosure.

The supply flow path 300 is a pipe path that supplies ink stored in the ink storage apparatus 200 to the ink-jet head 100. As described above, an industrial ink-jet printer is required to provide ink continuously so as to be suitable for a mass production process, and is using a structure in which an ink-jet head and an ink storage apparatus are separated, rather than a cartridge structure which is used in a small document printer in the past and in which a storage portion is coupled to a head. The ink supply system of the ink-jet head provided with the emergency drain function of the embodiment also has a structure in which the ink-jet head 100 and the ink storage apparatus 200 are separated, and is configured such that ink stored in the ink storage apparatus 200 is supplied to the ink-jet head 100 through the supply flow path 300 which has the first end connected to the ink storage apparatus 200 and which has the second end connected to the ink-jet head 100. The flow path blocker 510 is mounted at the supply flow path 300. Except for the configuration that the flow path blocker 510 is mounted at the supply flow path 300, a configuration for supplying ink to an ink-jet head from an ink storage apparatus may be generally applied without limitation.

The recovery flow path 400 is configured to circulate at least some of ink supplied to the ink-jet head 100 from the ink storage apparatus 200 back to the ink storage apparatus 200 so that ink does not stagnate and maintains a continuous flow. Conventionally, in a configuration of an ink-jet printer in which an ink-jet head and an ink storage apparatus are separated, only unidirectional ink movement in which ink in the ink storage apparatus is supplied to the ink-jet head was applied. However, as elements of ink applied to industrial ink-jet printing have become diverse, maintaining uniformity of ink has become very important. Furthermore, with the use of ink in which particles are dispersed, it has become more important to maintain a state in which particles are evenly dispersed without sinking. In order to maintain dispersibility and uniformity of ink, various technical factors may be applied in an ink storage apparatus and so on. Among the various technical factors, as in the present embodiment, a structure in which at least some of ink supplied to the ink-jet head 100 is recovered back to the ink storage apparatus 200 so that flow of the ink is maintained may be applied. The flow path changer 520 is mounted at the recovery flow path 400. Except for the configuration that the flow path changer 520 is mounted at the recovery flow path 400, a configuration for draining ink from an ink-jet head to an ink storage apparatus may be generally applied without limitation.

In the ink-jet head 100, the ink storage apparatus 200, the supply flow path 300, and the recovery flow path 400 that are described above, conventional technologies may be applied without limitation within a range that does not impair characteristics of the present disclosure.

Hereinafter, the flow path blocker 510, the flow path changer 520, the drain pipe 530, the drain ink storage portion 550, and the drain portion 540 that are as the emergency drain portion specifically applied in the present embodiment will be described.

The flow path blocker 510 is mounted at the supply flow path 300, and may perform an operation of blocking ink from moving through the supply flow path 300. Although various structures may be applied in the flow path blocker 510, it is preferable that a normally closed valve which is closed when a power is not supplied and which is only opened by a power supply is applied in the flow path blocker 510. The flow path blocker 510 of the present embodiment is configured to prevent ink stored in the ink storage apparatus 200 from being introduced into the ink-jet head 100 and from leaking during an emergency situation such as a power outage, and the normally closed valve that blocks the flow when a power is not supplied is applied in the flow path blocker 510, so that ink stored in the ink storage apparatus 200 may be prevented from being introduced into the ink-jet head 100 by blocking the supply flow path 300 in a power outage state. In the drawings, the normally closed valve that blocks the flow of fluid through a position of a diaphragm is applied, but there is no limitation, and a normally closed valve having various structures may be applied within a range that does not impair characteristics of the present disclosure.

The flow path changer 520 is mounted at the recovery flow path 400, and may perform an operation of changing a fluid flow direction of the recovery flow path 400 to the drain pipe 530, the recovery flow path 400 connecting the ink-jet head 100 and the ink storage apparatus 200 to each other. The recovery flow path 400 mounted so as to maintain dispersibility and uniformity of ink is configured to move ink from the ink-jet head 100 toward the ink storage apparatus 200. However, when a control is released in a state such as a power outage, the recovery flow path 400 may become a passage through which ink flows backward from the ink storage apparatus 200 toward the ink-jet head 100. At this time, a structure in which ink is blocked from moving through the recovery flow path 400 when a power outage occurs may be applied by mounting a flow path blocker at the recovery flow path 400. However, in this case, a conventional problem of leaking ink that is already supplied to the ink-jet head 100 is included. In the present embodiment, a method in which the drain pipe 530 for draining ink filled in the ink-jet head 100 to the outside is connected to the recovery flow path 400 and a connection direction is changed through the flow path changer 520 is applied. The flow path changer 520 may be a three-way valve that is configured to change a connection direction between the recovery flow path 400 connected to the ink-jet head 100, the recovery flow path 400 connected to the ink storage apparatus 200, and the drain pipe 530. Particularly, a normally closed valve that is configured to block the flow when a power is not supplied is applied to a portion connected to both sides of the recovery flow path 400, and a normally open valve that is configured to allow the flow when the power is not supplied is applied to a portion connected to the drain pipe 530. Therefore, since the recovery flow path 400 is blocked in a power outage state, ink stored in the ink storage apparatus 200 is capable of being prevented from being introduced into the ink-jet head 100, and ink filled in the ink-jet head 100 is capable of being discharged to the outside through the drain pipe 530. In the drawings, the three-way valve which has the normally closed valve that blocks the flow of fluid through a position of a diaphragm and which has the normally open valve is applied, but there is no limitation, and a valve having various structures may be applied within a range that does not impair characteristics of the present disclosure.

The drain pipe 530 is connected to the recovery flow path 400. In a normal state, a movement of ink is blocked by the flow path changer 520. However, in a situation such as a power outage, the drain pipe 530 is connected to the recovery flow path 400 by the flow path changer 520 and the drain pipe 530 becomes a passage through which ink filled in the ink-jet head 100 moves.

The drain ink storage portion 550 is connected to a second end of the drain pipe 530, and ink supplied to the ink-jet head 100 is moved through the drain pipe 530 and stored in the drain ink storage portion 550. Since ink used for industrial use may contain elements harmful to a human body or an environment, it is preferable that the ink is stored in a separate storage space.

The drain portion 540 is configured to generate a force for moving ink filled in the ink-jet head 100 through the drain pipe 530 to the drain ink storage portion 550. Various technologies for moving ink filled in the ink-jet head 100 may be applied. For example, ink filled in the ink-jet head 100 may be suctioned by such as a negative pressure of a vacuum pump or a gas pressure adjustment apparatus, and may be moved to the drain ink storage portion 550. Since the drain portion 540 is configured to be operated in a situation such as a power outage and so on, it is preferable that the drain portion 540 has a separate power source. Furthermore, in order to reduce a consumption of a power, it is preferable that the drain portion 540 is configured to maintain a standby state in a normal state and to be operated only in an emergency situation.

In the first embodiment illustrated, the flow path blocker 510 is mounted at the supply flow path 300 and the flow path changer 520 is mounted at the recovery flow path 400, but there is no limitation, and the flow path blocker 510 may be mounted at the recovery flow path 400 and the flow path changer 520 may be mounted at the supply flow path 300.

Figure 3:
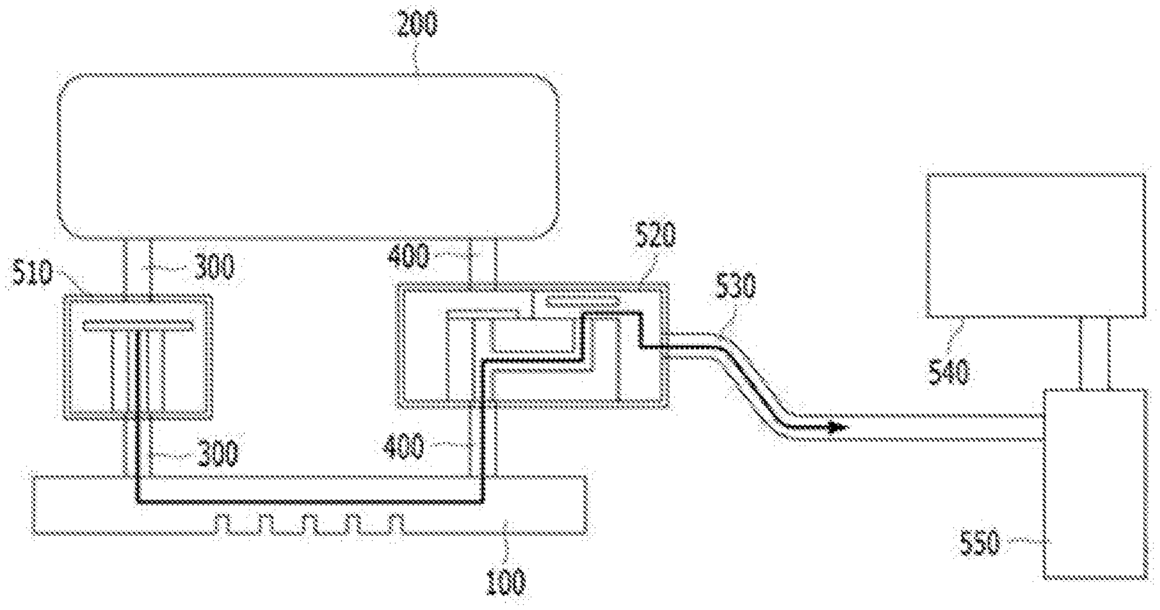
FIGS. 3 and 4 are views illustrating a process of emergency drain of ink in the ink supply system of the ink-jet head provided with the emergency drain function according to the first embodiment of the present disclosure.
Figure 4:
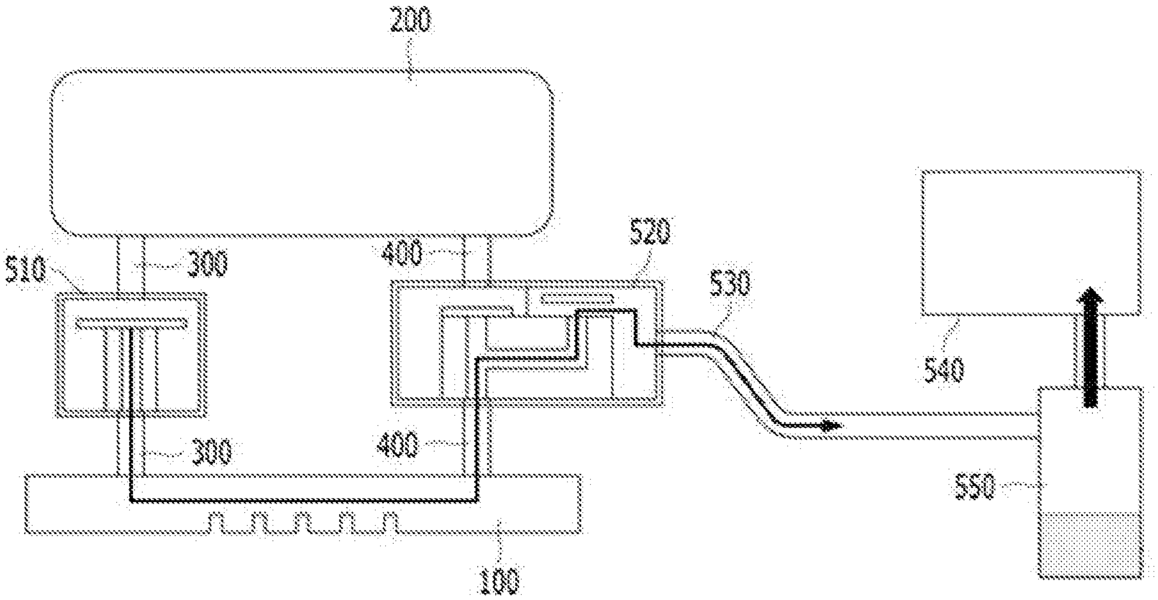

FIGS. 3 and 4 are views illustrating a process of emergency drain of ink in the ink supply system of the ink-jet head provided with the emergency drain function according to the first embodiment of the present disclosure.

When an emergency situation such as a power outage occurs and a power is blocked, electricity supply to the flow path blocker 510 and the flow path changer 520 is also stopped.

In such a situation, as illustrated in FIG. 3, since the flow path blocker 510 in which the normally closed valve is applied is closed, the supply flow path 300 is blocked, so that ink stored in the ink storage apparatus 200 is prevented from being introduced into the ink-jet head 100. Furthermore, in the three-way valve constituting the flow path changer 520, since a portion in which the normally closed valve is applied is closed, a movement of ink through the recovery flow path 400 is blocked, so that ink stored in the ink storage apparatus 200 is prevented from being introduced into the ink-jet head 100. At this time, in the three-way valve constituting the flow path changer 520, since the portion in which the normally closed valve is applied is closed, the portion in which the normally open valve is applied is opened, and a connection from the ink-jet head 100 to the drain pipe 530 is performed. However, even if the flow path blocker 510 and the flow path changer 520 block the flow between the ink-jet head 100 and the ink storage apparatus 200, a leakage of ink through the ink-jet head 100 cannot be prevented. First of all, during a process of closing the flow path blocker 510 and the flow path changer 520 in which valves in a diaphragm type are applied, since a diaphragm pushes a small amount of ink, a small amount of ink is additionally introduced into the ink-jet head 100, and leakage through the ink-jet head 100 occurs. Furthermore, when an emergency state such as a power outage is prolonged, a control of the ink-jet head 100 is stopped, and ink supplied to the ink-jet head 100 is continuously leaked.

In the present embodiment, in order to prevent ink already supplied to the ink-jet head 100 from leaking through the nozzle, a structure of discharging the ink through the drain pipe 530 is applied. As illustrated in FIG. 4, in addition to performing the connection from the ink-jet head 100 to the drain pipe 530 by the operation of the flow path changer 520, the drain portion 540 is operated and a suction force through the drain pipe 530 is generated, and ink filled in the ink-jet head 100 is moved to and stored in the drain ink storage portion 550 through the drain pipe 530.

Through this process, leakage caused by ink that is pushed by the diaphragm is not generated during the process of closing the flow path blocker 510 and the flow path changer 520 in which the valves in the diaphragm type are applied, and ink supplied to the ink-jet head 100 is discharged to the outside through the drain pipe 530, so that the leakage problem of ink through the nozzle may be solved.

In the ink-jet printer that includes the ink supply system of the ink-jet head provided with the emergency drain function described above, since ink is not leaked even in an emergency situation such as a power outage, a problem that a target object of printing and the ink-jet printer are contaminated due to ink leakage may be prevented. Furthermore, after an emergency situation is resolved, since a time required for cleaning and maintenance of the ink-jet printer contaminated with leaked ink is reduced, a time to resume a process may be reduced, so that efficiency of a process using the ink-jet printer may be increased.

Figure 5:
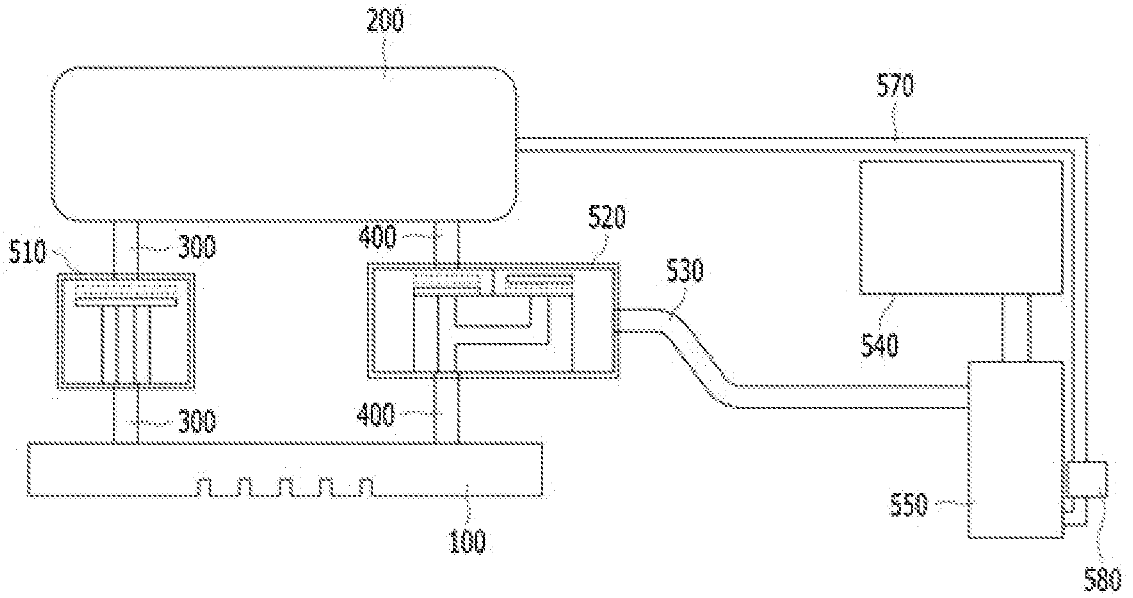
FIG. 5 is a view illustrating a configuration of the ink supply system of the ink-jet head provided with the emergency drain function according to a second embodiment of the present disclosure.

FIG. 5 is a view illustrating a configuration of the ink supply system of the ink-jet head provided with the emergency drain function according to a second embodiment of the present disclosure, and FIG. 2 is a view illustrating the ink supply structure in which the ink supply system of the ink-jet head provided with the emergency drain function of the present disclosure is capable of being applied.

The ink supply system of the ink-jet head provided with the emergency drain function according to the second embodiment of the present disclosure may be applied to an ink-jet printer having the ink supply system illustrated in FIG. 2 in which the ink supply structure is a circulation type, and the circulation type ink supply structure will be described first.

The ink-jet head 100 is the portion provided with the nozzle that is configured to discharge ink, an ink-jet printer illustrated is configured for the purpose of being used for industrial use, and the ink-jet printer is configured such that the ink-jet head 100 and the ink storage apparatus 200 are separated from each other. In a specific configuration of the ink-jet head 100, all technical configurations of a conventionally used ink-jet head may be applied within a range that does not impair characteristics of the present disclosure. Specifically, the specific configuration of the ink-jet head 100 may include a configuration for discharging bubbles to the outside of the ink-jet head 100 so that the nozzle of the ink-jet head 100 is not blocked by fine bubbles.

The ink storage apparatus 200 is a portion in which ink is stored so as to provide the ink to the ink-jet head 100. Furthermore, the first end of the supply flow path 300 for supplying ink to the ink-jet head 100 and the first end of the recovery flow path 400 in which ink remaining in the ink-jet head 100 is circulated and returned are connected to the ink storage apparatus 200, and the first end of the pressure control pipe 610 for maintaining a meniscus state is connected to the ink storage apparatus 200.

The second end of the supply flow path 300 and the second end of the recovery flow path 400 that respectively have the first ends connected to the ink storage apparatus 200 are connected to the ink-jet head 100. Furthermore, the ink-jet head 100 is supplied with ink through the supply flow path 300 and is configured to perform an ink-jet printing through the nozzle, and at least some of the supplied ink is recovered to the ink storage apparatus 200 through the recovery flow path 400 and is circulated.

The second end of the pressure control pipe 610 is connected to the gas pressure control apparatus 600, and the gas pressure control apparatus 600 is configured to control a pressure of the ink storage apparatus 200, thereby applying a negative pressure to the inside of the ink storage apparatus 200 so that ink inside the ink-jet head 100 maintains the meniscus state. After all, except for a special case, since a configuration in which air is continuously suctioned through the pressure control pipe 610 is provided, droplets of ink spread upward are capable of being moved through the pressure control pipe 610 while bubbles formed in the ink storage apparatus 200 burst. Droplets of ink introduced into the pressure control pipe 610 cause a failure of the gas pressure control apparatus 600.

The circulation pump 700 is mounted at the recovery flow path 400 through which at least some of ink supplied to the ink-jet head 100 is returned to the ink storage apparatus 200, and is configured to circulate ink. In the embodiment in FIG. 2, a case in which the circulation pump 700 is mounted at the recovery flow path 400 is illustrated, but there is no limitation, and the circulation pump 700 may be mounted at the supply flow path 300. As illustrated in the drawings, the circulation pump 700 is capable of maintaining dispersibility of ink by continuously circulating the ink between the ink storage apparatus 200 and the ink-jet head 100. At this time, it is preferable that an operation of the circulation pump 700 does not affect the meniscus state.

The buffer storage portion 800 may be applied so as to inject ink into the ink storage apparatus 200 without damaging the meniscus state. Furthermore, when ink is added to the buffer storage portion 800, additional ink is capable of being injected without considering the meniscus state. A loss occurs when printing is stopped during a process of replenishing ink consumed by performing the printing. However, when ink is replenished through the buffer storage portion 800, ink is capable of being continuously replenished without stopping the printing process.

As illustrated in FIG. 2, the ink supply system of the ink-jet head provided with the emergency drain function according to the second embodiment of the present disclosure is the same as a general circulation type ink supply system in that the ink supply system of the present disclosure includes the ink-jet head 100, the ink storage apparatus 200, the supply flow path 300, and the recovery flow path 400 that are as main components. In addition, the ink supply system of the present disclosure further includes the flow path blocker 510, the flow path changer 520, the drain pipe 530, the drain ink storage portion 550, the drain portion 540, and a return flow path 570 that are as an emergency drain portion.

The ink-jet head 100 is provided with the nozzle that is configured to discharge ink, and a configuration used for a head of an ink-jet printer that is commonly used for industrial use may be applied without limitation.

The ink storage apparatus 200 is a portion which is separated from the ink-jet head 100 and in which ink supplied to the ink-jet head 100 is stored. Although not illustrated, a gas pressure control apparatus configured to maintain the meniscus state in the ink-jet head 100 may be connected to the ink storage apparatus 200, and a buffer storage apparatus for injecting additional ink while the meniscus state is maintained may be connected to the ink storage apparatus 200. An ink storage apparatus configuration of a general ink-jet printer may be applied to such an ink storage apparatus 200 without limitation within a range that does not impair characteristics of the present disclosure.

The supply flow path 300 is a pipe path that supplies ink stored in the ink storage apparatus 200 to the ink-jet head 100. As described above, an industrial ink-jet printer is required to provide ink continuously so as to be suitable for a mass production process, and is using a structure in which an ink-jet head and an ink storage apparatus are separated, rather than a cartridge structure which is used in a small document printer in the past and in which a storage portion is coupled to a head. The ink supply system of the ink-jet head provided with the emergency drain function of the embodiment also has a structure in which the ink-jet head 100 and the ink storage apparatus 200 are separated, and is configured such that ink stored in the ink storage apparatus 200 is supplied to the ink-jet head 100 through the supply flow path 300 which has the first end connected to the ink storage apparatus 200 and which has the second end connected to the ink-jet head 100. The flow path blocker 510 is mounted at the supply flow path 300. Except for the configuration that the flow path blocker 510 is mounted at the supply flow path 300, a configuration for supplying ink to an ink-jet head from an ink storage apparatus may be generally applied without limitation.

The recovery flow path 400 is configured to circulate at least some of ink supplied to the ink-jet head 100 from the ink storage apparatus 200 back to the ink storage apparatus 200 so that ink does not stagnate and maintains a continuous flow. Conventionally, in a configuration of an ink-jet printer in which an ink-jet head and an ink storage apparatus are separated, only unidirectional ink movement in which ink in the ink storage apparatus is supplied to the ink-jet head was applied. However, as elements of ink applied to industrial ink-jet printing have become diverse, maintaining uniformity of ink has become very important. Furthermore, with the use of ink in which particles are dispersed, it has become more important to maintain a state in which particles are evenly dispersed without sinking. In order to maintain dispersibility and uniformity of ink, various technical factors may be applied in an ink storage apparatus and so on. Among the various technical factors, as in the present embodiment, a structure in which at least some of ink supplied to the ink-jet head 100 is recovered back to the ink storage apparatus 200 so that flow of the ink is maintained may be applied. The flow path changer 520 is mounted at the recovery flow path 400. Except for the configuration that the flow path changer 520 is mounted at the recovery flow path 400, a configuration for draining ink from an ink-jet head to an ink storage apparatus may be generally applied without limitation.

In the ink-jet head 100, the ink storage apparatus 200, the supply flow path 300, and the recovery flow path 400 that are described above, conventional technologies may be applied without limitation within a range that does not impair characteristics of the present disclosure.

Hereinafter, the flow path blocker 510, the flow path changer 520, the drain pipe 530, the drain ink storage portion 550, the drain portion, and the return flow path 570 that are as the emergency drain portion specifically applied in the present embodiment will be described.

The flow path blocker 510 is mounted at the supply flow path 300, and may perform an operation of blocking ink from moving through the supply flow path 300. Although various structures may be applied in the flow path blocker 510, it is preferable that a normally closed valve which is closed when a power is not supplied and which is only opened by a power supply is applied in the flow path blocker 510. The flow path blocker 510 of the present embodiment is configured to prevent ink stored in the ink storage apparatus 200 from being introduced into the ink-jet head 100 and from leaking during an emergency situation such as a power outage, and the normally closed valve that blocks the flow when a power is not supplied is applied in the flow path blocker 510, so that ink stored in the ink storage apparatus 200 may be prevented from being introduced into the ink-jet head 100 by blocking the supply flow path 300 in a power outage state. In the drawings, the normally closed valve that blocks the flow of fluid through a position of a diaphragm is applied, but there is no limitation, and a normally closed valve having various structures may be applied within a range that does not impair characteristics of the present disclosure.

The flow path changer 520 is mounted at the recovery flow path 400, and may perform an operation of changing a fluid flow direction of the recovery flow path 400 to the drain pipe 530, the recovery flow path 400 connecting the ink-jet head 100 and the ink storage apparatus 200 to each other. The recovery flow path 400 mounted so as to maintain dispersibility and uniformity of ink is configured to move ink from the ink-jet head 100 toward the ink storage apparatus 200. However, when a control is released in a state such as a power outage, the recovery flow path 400 may become a passage through which ink flows backward from the ink storage apparatus 200 toward the ink-jet head 100. At this time, a structure in which ink is blocked from moving through the recovery flow path 400 when a power outage occurs may be applied by mounting a flow path blocker at the recovery flow path 400. However, in this case, a conventional problem of leaking ink that is already supplied to the ink-jet head 100 is included. In the present embodiment, a method in which the drain pipe 530 for draining ink filled in the ink-jet head 100 to the outside is connected to the recovery flow path 400 and a connection direction is changed through the flow path changer 520 is applied. The flow path changer 520 may be a three-way valve that is configured to change a connection direction between the recovery flow path 400 connected to the ink-jet head 100, the recovery flow path 400 connected to the ink storage apparatus 200, and the drain pipe 530. Particularly, a normally closed valve that is configured to block the flow when a power is not supplied is applied to a portion connected to both sides of the recovery flow path 400, and a normally open valve that is configured to allow the flow when the power is not supplied is applied to a portion connected to the drain pipe 530. Therefore, since the recovery flow path 400 is blocked in a power outage state, ink stored in the ink storage apparatus 200 is capable of being prevented from being introduced into the ink-jet head 100, and ink filled in the ink-jet head 100 is capable of being discharged to the outside through the drain pipe 530. In the drawings, the three-way valve which has the normally closed valve that blocks the flow of fluid through a position of a diaphragm and which has the normally open valve is applied, but there is no limitation, and a valve having various structures may be applied within a range that does not impair characteristics of the present disclosure.

The drain pipe 530 is connected to the recovery flow path 400. In a normal state, a movement of ink is blocked by the flow path changer 520. However, in a situation such as a power outage, the drain pipe 530 is connected to the recovery flow path 400 by the flow path changer 520 and the drain pipe 530 becomes a passage through which ink filled in the ink-jet head 100 moves.

The drain ink storage portion 550 is connected to a second end of the drain pipe 530, and ink supplied to the ink-jet head 100 is moved through the drain pipe 530 and stored in the drain ink storage portion 550. Since ink used for industrial use may contain elements harmful to a human body or an environment, it is preferable that the ink is stored in a separate storage space.

The drain portion 540 is configured to generate a force for moving ink filled in the ink-jet head 100 through the drain pipe 530 to the drain ink storage portion 550. Various technologies for moving ink filled in the ink-jet head 100 may be applied. For example, ink filled in the ink-jet head 100 may be suctioned by such as a negative pressure of a vacuum pump or a gas pressure adjustment apparatus, and may be moved to the drain ink storage portion 550. Since the drain portion 540 is configured to be operated in a situation such as a power outage and so on, it is preferable that the drain portion 540 has a separate power source. Furthermore, in order to reduce a consumption of a power, it is preferable that the drain portion 540 is configured to maintain a standby state in a normal state and to be operated only in an emergency situation.

The return flow path 570 is formed between the drain ink storage portion 550 and the ink storage apparatus 200, and is configured to send ink stored in the drain ink storage portion 550 back to the ink storage portion 200. A return valve 580 may be mounted at the return flow path 570 so that an operation of returning ink stored in the drain ink storage portion 550 back to the ink storage apparatus 200 is capable of being selectively performed. In addition, a pump and so on for transferring ink to the ink storage apparatus 200 through the return flow path 570 may be provided. However, in the embodiment, a structure in which a positive pressure generated in the drain portion 540 applying a gas pressure control apparatus is used is applied.

Meanwhile, in the process of transferring ink stored in the drain ink storage portion 550 to the ink storage apparatus 200 through the return flow path 570, ink stored in the drain ink storage portion 550 may be introduced into the drain pipe 530. At this time, by an operation of the flow path changer 520 connected to the drain pipe 530, ink cannot be injected into the recovery flow path 400 through the drain pipe 530, but there is a disadvantage that the amount of ink recovered to the ink storage apparatus 200 is reduced when ink is introduced into the drain pipe 530. As illustrated in the embodiment, inflow of ink into the drain pipe 530 may be prevented by specifying mounting positions of the drain pipe 530 and the return flow path 570, and an additional valve may be applied to a position where the drain pipe 530 is connected.

In the second embodiment illustrated, the flow path blocker 510 is mounted at the supply flow path 300 and the flow path changer 520 is mounted at the recovery flow path 400, but there is no limitation, and the flow path blocker 510 may be mounted at the recovery flow path 400 and the flow path changer 520 may be mounted at the supply flow path 300.

Figure 6:
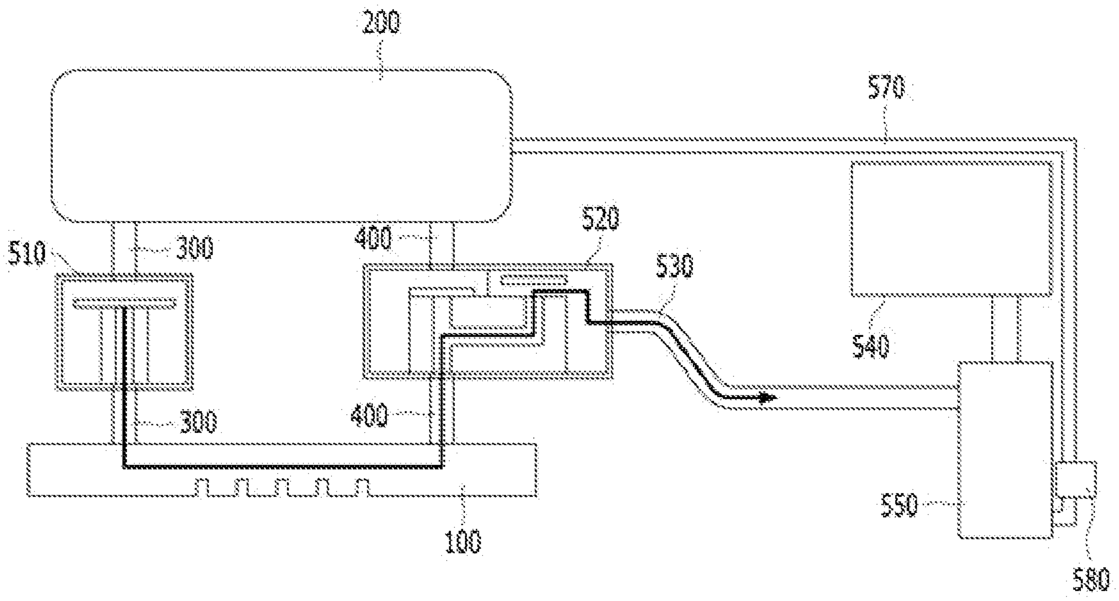
FIGS. 6 to 8 are views illustrating a process of emergency drain of ink in the ink supply system of the ink-jet head provided with the emergency drain function according to the second embodiment of the present disclosure.
Figure 7:
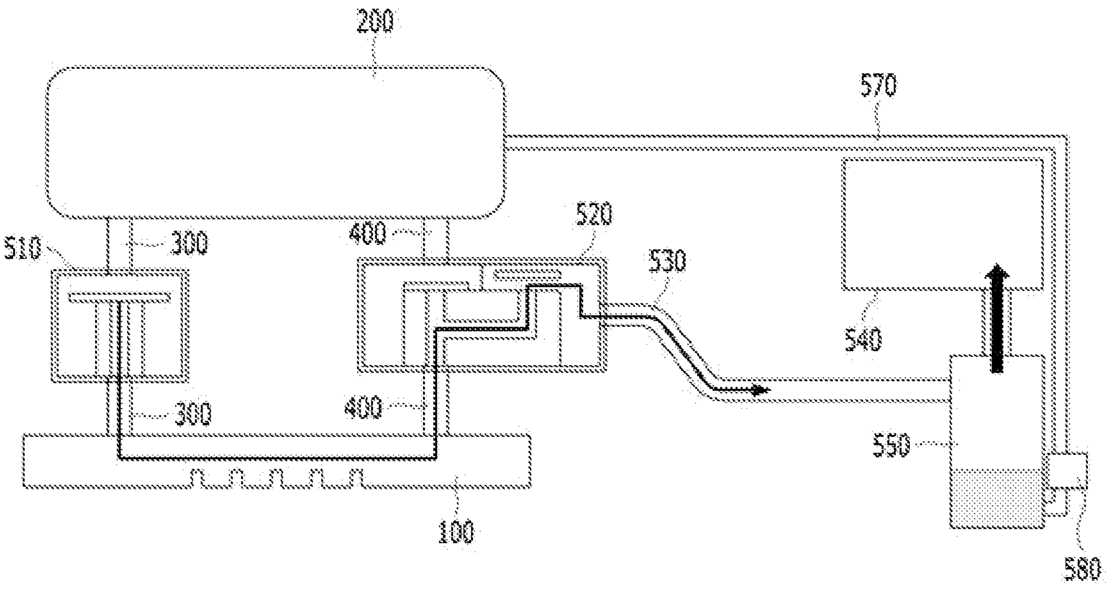
Figure 8:
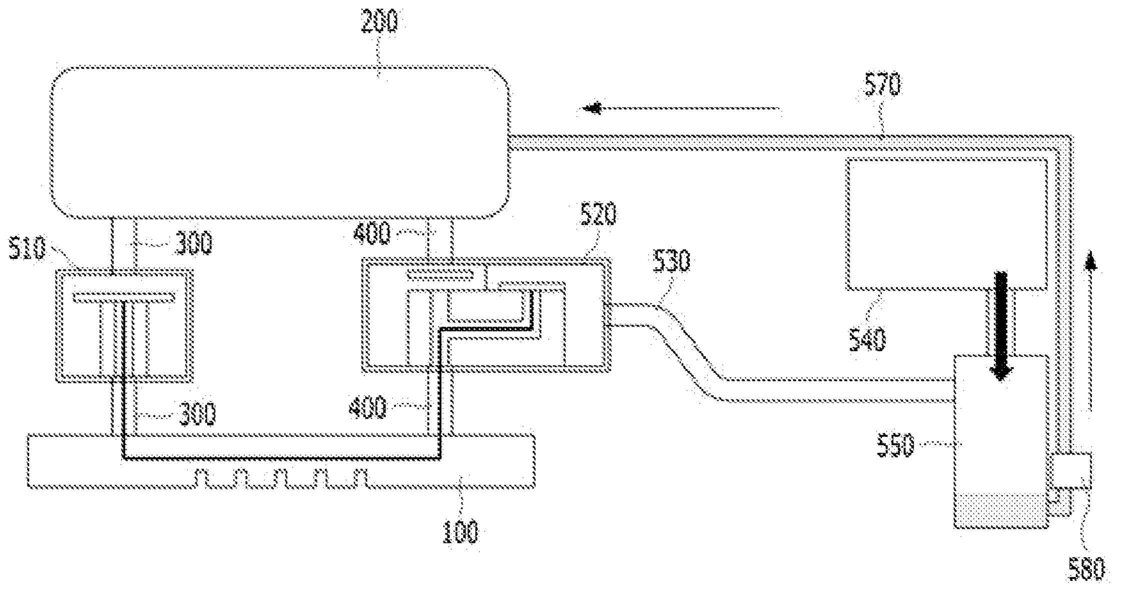

FIGS. 6 to 8 are views illustrating a process of emergency drain of ink in the ink supply system of the ink-jet head provided with the emergency drain function according to the second embodiment of the present disclosure.

When an emergency situation such as a power outage occurs and a power is blocked, electricity supply to the flow path blocker 510 and the flow path changer 520 is also stopped.

In such a situation, as illustrated in FIG. 6, since the flow path blocker 510 in which the normally closed valve is applied is closed, the supply flow path 300 is blocked, so that ink stored in the ink storage apparatus 200 is prevented from being introduced into the ink-jet head 100. Furthermore, in the three-way valve constituting the flow path changer 520, since a portion in which the normally closed valve is applied is closed, a movement of ink through the recovery flow path 400 is blocked, so that ink stored in the ink storage apparatus 200 is prevented from being introduced into the ink-jet head 100. At this time, in the three-way valve constituting the flow path changer 520, since the portion in which the normally closed valve is applied is closed, the portion in which the normally open valve is applied is opened, and a connection from the ink-jet head 100 to the drain pipe 530 is performed. However, even if the flow path blocker 510 and the flow path changer 520 block the flow between the ink-jet head 100 and the ink storage apparatus 200, a leakage of ink through the ink-jet head 100 cannot be prevented. First of all, during a process of closing the flow path blocker 510 and the flow path changer 520 in which valves in a diaphragm type are applied, since a diaphragm pushes a small amount of ink, a small amount of ink is additionally introduced into the ink-jet head 100, and leakage through the ink-jet head 100 occurs. Furthermore, when an emergency state such as a power outage is prolonged, a control of the ink-jet head 100 is stopped, and ink supplied to the ink-jet head 100 is continuously leaked. At this time, the return valve 580 mounted at the return flow path 570 is in a closed state.

In the present embodiment, in order to prevent ink already supplied to the ink-jet head 100 from leaking through the nozzle, a structure of discharging the ink through the drain pipe 530 is applied. As illustrated in FIG. 7, in addition to pertaining the connection from the ink-jet head 100 to the drain pipe 530 by the operation of the flow path changer 520, the drain portion 540 is operated and a suction force through the drain pipe 530 is generated, and ink filled in the ink-jet head 100 is moved to and stored in the drain ink storage portion 550 through the drain pipe 530. At this time, the return valve 580 is still in the closed state.

Through this process, leakage caused by ink that is pushed by the diaphragm is not generated during the process of closing the flow path blocker 510 and the flow path changer 520 in which the valves in the diaphragm type are applied, and ink supplied to the ink-jet head 100 is discharged to the outside through the drain pipe 530, so that the leakage problem of ink through the nozzle may be solved.

In the embodiment, ink stored in the drain ink storage unit 550 by performing emergency drain is returned to the ink storage apparatus 200, thereby being capable of increasing ink utilization. At this time, a separate pump and so on may be used. However, as illustrated in FIG. 8, by applying a positive pressure from the drain portion 540 using the gas pressure control apparatus, ink stored in the drain ink storage portion 550 is capable of being returned to the ink storage apparatus 200. As such, in order to return ink stored in the drain ink storage portion 550 to the ink storage apparatus 200 by using a positive pressure of the drain portion 540, the return valve 580 is required to be opened and the valve connected to the drain pipe 530 is required to be closed in the flow path changer 520. At this time, as illustrated in the embodiment, inflow of ink into the drain pipe 530 may be prevented by specifying mounting positions of the drain pipe 530 and the return flow path 570, and an additional valve may be applied to a position where the drain pipe 530 is connected.

As such, the operation of returning ink stored in the drain ink storage portion 550 to the ink storage apparatus 200 may be performed after an emergency situation is all resolved and a power is restored, or may be performed when an emergency situation is not all resolved. However, in a state in which a power is not restored, the valve connected to the drain pipe 530 in the flow path changer 520 may be in an opened state. Therefore, the operating of returning ink is required to be performed while the valve connected to the drain pipe 530 is in the closed state by separately operating the flow path changer 520.

In the ink-jet printer that includes the ink supply system of the ink-jet head provided with the emergency drain function described above, since ink is not leaked even in an emergency situation such as a power outage, a problem that a target object of printing and the ink-jet printer are contaminated due to ink leakage may be prevented. Furthermore, after an emergency situation is resolved, since a time required for cleaning and maintenance of the ink-jet printer contaminated with leaked ink so that a process is capable of being resumed may be reduced, efficiency of a process using the ink-jet printer may be increased.

Although the preferred embodiments of the present disclosure have been disclosed for illustrative purposes, those skilled in the art will appreciate that various modifications, additions and substitutions are possible, without departing from the technical idea of the present disclosure. Therefore, the scope of protection of the present disclosure should be determined by the scope of the appended claims, rather than the specific embodiments, and all technical ideas falling within the scope of the claims should be construed as being included in the scope of the present disclosure.

What is claimed is:

1. An ink supply system of an ink-jet head provided with an emergency drain function, the ink supply system comprising:
- an ink-jet head having a nozzle configured to discharge ink;
- an ink storage apparatus in which ink supplied to the ink-jet head is stored;
- a supply flow path configured to supply ink stored in the ink storage apparatus to the ink-jet head;
- a recovery flow path configured to return at least some of ink supplied to the ink-jet head to the ink storage apparatus;
- a flow path blocker mounted at any one of the supply flow path and the recovery flow path, the flow path blocker being configured to block an ink flow between the ink-jet head and the ink storage apparatus in an emergency situation;
- a flow path changer mounted at the other one of the supply flow path and the recovery flow path, the flow path changer being configured to block an ink flow between the ink-jet head and the ink storage apparatus and to connect a drain pipe with the ink-jet head in the emergency situation;
- the drain pipe connected to the flow path changer, thereby being connected to the ink-jet head in the emergency situation;
- a drain ink storage portion connected to the drain pipe, the drain ink storage portion being configured to drain and store ink already supplied in the ink-jet head in the emergency situation; and
- a drain portion configured to drain ink already supplied in the ink-jet head in the emergency situation.

2. The ink supply system of claim 1, further comprising a return flow path connecting the drain ink storage portion and the ink storage apparatus to each other so that ink stored in the drain ink storage portion is capable of being returned to the ink storage apparatus.

3. The ink supply system of claim 2, further comprising a return valve, the return valve being mounted at the return flow path and being configured to control a connection between the drain ink storage portion and the ink storage apparatus.

4. The ink supply system of claim 2, wherein the drain portion is a gas pressure control apparatus capable of applying a negative pressure and a positive pressure to the drain ink storage portion, is configured to apply the negative pressure to the drain ink storage portion when ink already supplied to the ink-jet head is drained through the drain pipe, and is configured to apply the positive pressure to the drain ink storage portion when ink stored in the drain ink storage portion is returned to the ink storage apparatus.

5. The ink supply system of claim 1, wherein the flow path blocker is a normally closed valve.

6. The ink supply system of claim 1, wherein, in the flow path changer, a normally open valve is mounted between the ink-jet head and the drain pipe, and a normally closed valve is mounted between the ink-jet head and the ink storage apparatus.

7. An ink-jet printer having an ink supply system of an ink-jet head provided with an emergency drain function, the ink supply system comprising:
- an ink-jet head having a nozzle configured to discharge ink;
- an ink storage apparatus in which ink supplied to the ink-jet head is stored;

a supply flow path configured to supply ink stored in the ink storage apparatus to the ink-jet head;

a recovery flow path configured to return at least some of ink supplied to the ink-jet head to the ink storage apparatus;

a flow path blocker mounted at any one of the supply flow path and the recovery flow path, the flow path blocker being configured to block an ink flow between the ink-jet head and the ink storage apparatus in an emergency situation;

a flow path changer mounted at the other one of the supply flow path and the recovery flow path, the flow path changer being configured to block an ink flow between the ink-jet head and the ink storage apparatus and to connect a drain pipe with the ink-jet head in the emergency situation;

the drain pipe connected to the flow path changer, thereby being connected to the ink-jet head in the emergency situation;

a drain ink storage portion connected to the drain pipe, the drain ink storage portion being configured to drain and store ink already supplied in the ink-jet head in the emergency situation; and a drain portion configured to drain ink already supplied in the ink-jet head in the emergency situation.

8. The ink-jet printer of claim 7, further comprising a return flow path connecting the drain ink storage portion and the ink storage apparatus to each other so that ink stored in the drain ink storage portion is capable of being returned to the ink storage apparatus.

9. The ink-jet printer of claim 8, further comprising a return valve, the return valve being mounted at the return flow path and being configured to control a connection between the drain ink storage portion and the ink storage apparatus.

10. The ink-jet printer of claim 8, wherein the drain portion is a gas pressure control apparatus capable of applying a negative pressure and a positive pressure to the drain ink storage portion, is configured to apply the negative pressure to the drain ink storage portion when ink already supplied to the ink-jet head is drained through the drain pipe, and is configured to apply the positive pressure to the drain ink storage portion when ink stored in the drain ink storage portion is returned to the ink storage apparatus.

11. The ink-jet printer of claim 7, wherein the flow path blocker is a normally closed valve.

12. The ink-jet printer of claim 7, wherein, in the flow path changer, a normally open valve is mounted between the ink-jet head and the drain pipe, and a normally closed valve is mounted between the ink-jet head and the ink storage apparatus.

* * * * *